(12) United States Patent
LeBlanc et al.

(10) Patent No.: US 6,237,369 B1
(45) Date of Patent: May 29, 2001

(54) ROOF-MOUNTED OXYGEN-FUEL BURNER FOR A GLASS MELTING FURNACE AND PROCESS OF USING THE OXYGEN-FUEL BURNER

(75) Inventors: John R. LeBlanc, Perrsyburg, OH (US); Rifat M. Khalil Alchalabi, Fanwood, NJ (US); David J. Baker, Newark, OH (US); Harry P. Adams, Granville, OH (US); James K. Hayward, Newark, OH (US)

(73) Assignees: Owens Corning Fiberglas Technology, Inc., Summit, IL (US); The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 08/992,136

(22) Filed: Dec. 17, 1997

(51) Int. Cl.$^7$ ..................................................... C03B 5/18
(52) U.S. Cl. ................. 65/134.1; 65/134.4; 65/134.5; 65/135.1; 65/135.9; 65/136.2; 65/136.3; 65/335; 65/355; 65/356
(58) Field of Search ............... 65/134.1, 134.4, 65/134.5, 135.1, 135.9, 136.2, 136.3, 335, 355, 356

(56) References Cited

U.S. PATENT DOCUMENTS

| Re. 32,317 | 12/1986 | Kunkle et al. | 65/135 |
|---|---|---|---|
| 725,173 | 4/1903 | Thompson . | |
| 1,805,066 | * 5/1931 | Andrieux et al. | 431/8 |
| 1,950,044 | * 3/1934 | Wilson | 431/8 |
| 2,138,998 | * 12/1938 | Brosius | 431/8 |
| 2,360,548 | * 10/1944 | Conway | 431/8 |
| 2,970,829 | 2/1961 | Reynders | 263/52 |
| 3,129,930 | 4/1964 | Labat-Camy | 263/15 |
| 3,132,854 | 5/1964 | Hilliard et al. | 263/43 |
| 3,337,324 | * 8/1967 | Cable, Jr. et al. . | |
| 3,592,622 | 7/1971 | Shepherd | 65/135 |
| 4,381,934 | 5/1983 | Kunkle et al. | 65/135 |
| 4,473,388 | 9/1984 | Lauwers | 65/134 |
| 4,492,594 | 1/1985 | Curley | 65/134 |
| 4,496,387 | 1/1985 | Heithoff et al. | 65/335 |
| 4,519,814 | 5/1985 | Demarest, Jr. | 65/27 |
| 4,521,238 | 6/1985 | Heithoff | 65/135 |
| 4,529,428 | 7/1985 | Groetzinger | 65/27 |
| 4,531,960 | * 7/1985 | Desprez | 65/136.3 |
| 4,539,034 | 9/1985 | Hanneken | 65/134 |
| 4,539,035 | 9/1985 | Burckhardt et al. | 65/136 |
| 4,545,800 | 10/1985 | Won et al. | 65/134 |
| 4,564,379 | 1/1986 | Kunkle et al. | 65/135 |
| 4,565,560 | * 1/1986 | Krumwiede et al. | 65/136.3 |
| 4,599,100 | 7/1986 | Demarest, Jr. | 65/134 |
| 4,604,121 | 8/1986 | Demarest, Jr., et al. | 65/27 |
| 4,654,068 | 3/1987 | Kunkle et al. | 65/135 |
| 4,666,489 | 5/1987 | Demarest | 65/27 |
| 4,671,765 | 6/1987 | Tsai | 432/13 |
| 4,675,041 | 6/1987 | Tsai | 65/27 |
| 4,676,819 | 6/1987 | Radecki et al. | 65/135 |
| 4,678,491 | 7/1987 | Tsai | 65/27 |
| 4,708,728 | 11/1987 | Desprez et al. | 65/136 |
| 4,725,299 | 2/1988 | Khinkis et al. | 65/134 |
| 4,738,702 | 4/1988 | Yigdall et al. | 65/27 |
| 4,738,938 | 4/1988 | Kunkle et al. | 501/72 |

(List continued on next page.)

Primary Examiner—Stanley S. Silverman
Assistant Examiner—Michael P. Colaianni
(74) Attorney, Agent, or Firm—Inger H. Eckert

(57) ABSTRACT

Briefly, according to the present invention there is provided a refractory lined glass melter for producing refined glass from raw glass-forming material using at least one oxygen-fuel burner recessed within a burner block mounted in the roof of the furnace and a process of using the burner. The velocities of the gaseous fuel and of the oxygen from the oxygen-fuel burner are controlled such that the velocities of the gaseous fuel and the oxygen are substantially equivalent to provide a generally laminar gaseous fuel and oxygen flow to combust proximate a top surface of the raw glass-forming material and produce a flame which impinges the surface of the raw glass-forming material and which has a middle portion of a columnar shape.

5 Claims, 5 Drawing Sheets

U.S. PATENT DOCUMENTS

| | | | |
|---|---|---|---|
| 4,789,390 | 12/1988 | Kunkle et al. | 65/27 |
| 4,798,616 | 1/1989 | Knavish et al. | 65/135 |
| 4,808,205 | 2/1989 | Hughes et al. | 65/135 |
| 4,816,056 * | 3/1989 | Tsai et al. | |
| 4,886,539 | 12/1989 | Gerutti et al. | 65/135 |
| 4,911,744 | 3/1990 | Petersson et al. | 65/136 |
| 4,973,346 | 11/1990 | Kobayashi | 65/135 |
| 5,057,140 | 10/1991 | Nixon | 65/335 |
| 5,139,558 * | 8/1992 | Lauwers. | |
| 5,236,484 | 8/1993 | McNeill | 65/27 |
| 5,256,058 * | 10/1993 | Slavejkov et al. | |
| 5,346,524 | 9/1994 | Shamp et al. | 65/134.4 |
| 5,447,547 | 9/1995 | Goldfarb et al. | 65/134.1 |
| 5,500,030 * | 3/1996 | Joshi et al. | 65/134.4 |
| 5,560,758 | 10/1996 | Brown et al. | 65/134.4 |
| 5,643,348 | 7/1997 | Shamp et al. | 65/134.4 |
| 5,743,723 * | 4/1998 | Iatrides et al. | 431/8 |
| 5,871,343 * | 2/1999 | Baukal, Jr. et al. | 431/8 |

\* cited by examiner

ROOF-MOUNTED OXYGEN-FUEL BURNER FOR A GLASS MELTING FURNACE AND PROCESS OF USING THE OXYGEN-FUEL BURNER

FIELD OF THE INVENTION

This invention relates to a glass melting furnace having at least one oxygen-fuel burner in the roof of the glass melting furnace to melt raw glass-forming material also known as batch, and a process of using the oxygen-fuel burner. More particularly, this invention relates to a glass melting furnace having at least one oxygen-fuel burner in the roof of the glass melting furnace for melting raw glass-forming material without the use of regenerators or recuperators to improve the rate of melting and the quality of glass products and a process of using the oxygen-fuel burner.

BACKGROUND OF THE INVENTION

Regenerative or recuperative furnaces having melting and fining zones have been commonly employed to manufacture glass. The regenerative or recuperative furnaces, unlike other types of furnaces, employ at least one regenerator or recuperator in operating air-fuel burners. At least one regenerator or recuperator, which may come in many different shapes and sizes, serves to preheat air used in the air-fuel burners. In the regenerator the preheating is generally accomplished by transferring the heat in the existing waste gas from a melting chamber to refractory bricks stacked in a checkerboard fashion. The bricks, in turn, give up their heat to the incoming air which will be used in combusting the fuel. Commonly, the recuperator may consist generally of a double wall tubing in which the off gas from the melting chamber flows in the central tube either countercurrent or concurrent to the air which is passing through the annulus. The performance of the regenerator or recuperator, however, may deteriorate with time because the regenerator or recuperator may be partially plugged or destroyed when it is subject to the waste gas containing chemical contaminants for a long period. The partially plugged or destroyed regenerator or recuperator adversely affects the performance of air-fuel burners, thereby decreasing the glass production rate and fuel efficiency.

It has been known, therefore, to employ oxygen-fuel burners, in a number of furnaces to supplement or totally replace the air-fuel burners. The oxygen-fuel burners have been designed to produce a flame and heat transfer similar to that of convention air-fuel burners. Specifically, the oxygen fuel burners are designed to fire parallel or substantially parallel to the surface of the glass. These burners transfer heat upward into the furnace crown and surrounding refractories as well as into the glass. Heat transfer is achieved by direct radiation from the flame and by re-radiation from the refractory superstructure of the glass furnace. Little heat is transferred to the glass by convection or conduction. The capacity of the glass furnace is limited by the highest refractory temperature within the melting chamber. Accordingly, one concern in the use of oxygen-fuel burners has been the risk associated with the high temperature of the burners and overheating of the refractory roof and walls of the furnace.

The present invention utilizes the higher flame temperature and lower mass flow rate achievable with oxygen-fuel combustion to significantly increase the heat transfer into the glass while maintaining refractory temperatures within operating limits. This is accomplished by utilizing at least one oxygen-fuel burner firing perpendicular or substantially perpendicular to the glass surface rather than in the conventional parallel configuration. By firing the burners perpendicular to the glass surface the convective and radiant properties of the flame are utilized to transfer energy to the raw glass-forming material rather than radiant heat transfer only. Accordingly, the luminosity and high temperature portion of the flame is placed in close proximity if not in direct contact with the raw glass-forming material to increase heat transfer via radiation. With radiation being an exponential function of distance from the heat source, the heat transfer by radiation is much greater in the glass melting furnace in accordance with the present invention than conventional furnaces. In addition, the impingement of the high temperature flame onto the raw glass forming material substantially increases the heat transfer via convection at the area of impingement of the flame. Consequently, the increased rate of heat transfer to the glass and batch results in a very substantial increase in the rate of melting and fining the glass. Furthermore, because the majority of the heat transfer is directly from the higher temperature impinging flame and not from the refractory, the melting capacity of the glass furnace is increased, without thermal deterioration of the refractory.

Accordingly, it is an object of the invention to increase the melting capacity of a glass furnace without increasing the risk of overheating the roof and walls of the furnace. It is another object of the invention to maintain a particular glass production rate without the use of regenerators or recuperators. It is a further object of the invention to reduce the formation of NOx during the glass melting. Yet another object of the present invention is to reduce the size of glass furnace required per given capacity over a conventional air-fuel glass furnace or a conventional oxygen-fuel glass furnace. Still another object of the present invention is to reduce the total energy required per ton of glass melted over conventional air-fuel glass furnaces. Another object of the present invention is to provide a glass furnace that permits better utilization of capacity and more flexibility of operation thus reducing melter capital cost per ton of glass produced.

SUMMARY OF THE INVENTION

Briefly, according to the present invention there is provided a refractory lined glass melter for producing refined glass from raw glass-forming material. The glass melter includes a roof connected to a bottom by side walls and defining an elongated channel having a melting zone and a downstream fining zone and at least one oxygen-fuel burner located within the roof of the glass melter. The oxygen-fuel burner has an inner central cylindrical fuel conduit for providing gaseous fuel and an outer cylindrical oxygen conduit concentric with the central fuel outlet for providing oxygen. The burner is designed so as to control the velocity of the gaseous fuel and the oxygen from the oxygen-fuel burner such that the velocity of the gaseous fuel and the oxygen are substantially equivalent to provide a generally laminar gaseous fuel and oxygen flow to combust proximate a top surface of the raw glass-forming material and produce a flame which impinges the surface of the raw glass-forming material and which has a middle portion of a columnar shape.

The present invention also includes a process for producing refined glass from raw glass-forming material in the refractory lined glass melter. The process includes the steps of charging raw glass-forming material to the melting zone of the glass melter and providing at least one oxygen-fuel burner within the roof of the glass melter having an inner central cylindrical gaseous fuel conduit for providing gaseous fuel and an outer cylindrical oxygen conduit concentric with the central fuel outlet for providing oxygen. The velocity of the gaseous fuel and the oxygen from the oxygen-fuel burner is controlled such that the velocity of the gaseous fuel and the oxygen are substantially equivalent to provide a generally laminar gaseous fuel flow and generally laminar oxygen flow to combust proximate a top surface of the raw glass-forming material and produce a flame which impinges the surface of the raw glass-forming material and which has a middle portion of an approximately columnar shape. The flame melts the raw glass-forming material within the melting zone by means of the flame coverage from the at least one oxygen-fuel burner without the use of regenerators or recuperators. The refined molten glass is then withdrawn from the fining zone.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
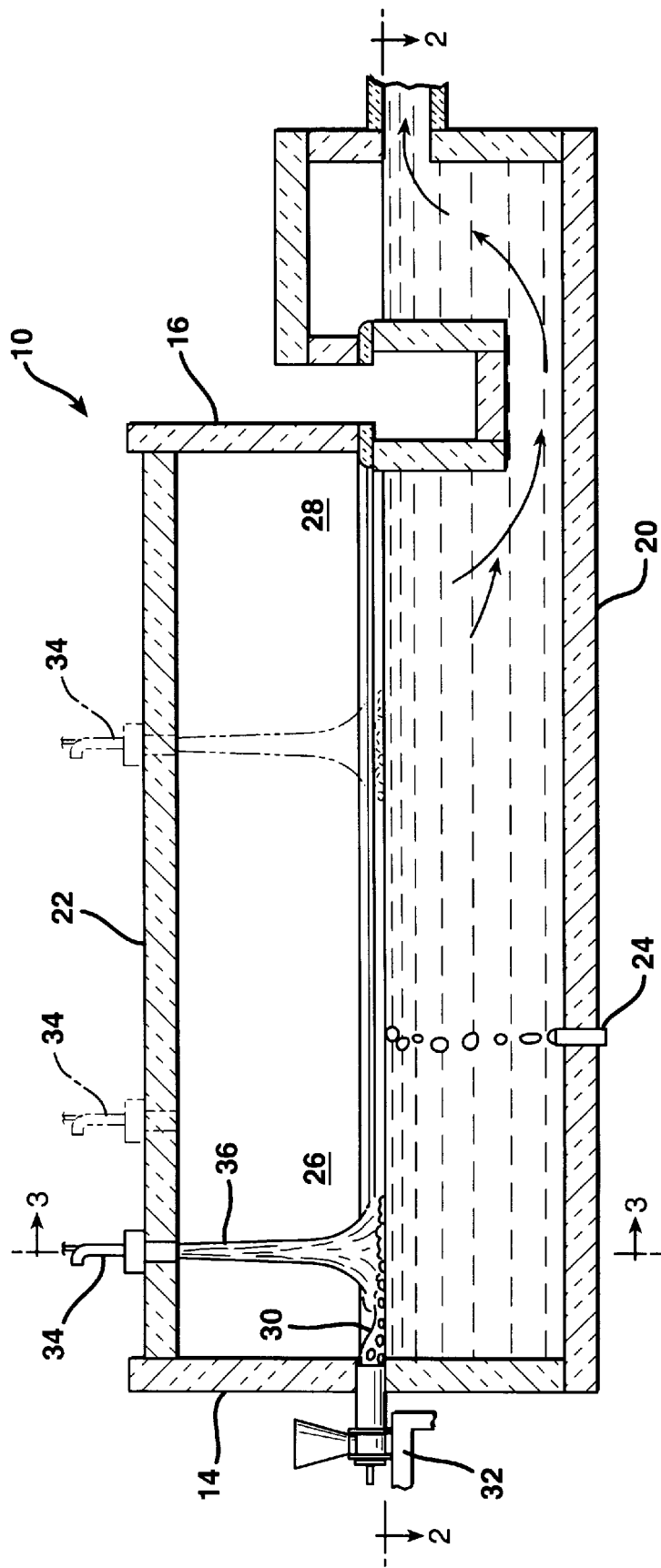
FIG. 1 is a cross-sectional longitudinal view of a glass melting furnace in accordance with the present invention.

Referring to the figures, there is shown a glass melting furnace 10 for providing molten glass to a glass forehearth 12 wherein the molten glass is further refined and subsequently fed to one or more glass-forming machines such as containers, fiberizers and the like (not shown). In considering the figures, it will be appreciated that for purposes of clarity certain details of construction are not provided in view of such details being conventional and well within the skill of the art once the invention is disclosed and explained.

The glass melting furnace 10 typically includes an elongated channel having an upstream end wall 14 and a downstream end wall 16, side walls 18, a floor 20 and a roof 22 all made from appropriate refractory materials such as alumina, silica, alumina-silica, zircon, zirconia-alumina-silica and the like. The roof 22 is shown generally as having an arcuate shape transverse to the longitudinal axis of the channel, however, the roof may be of most any suitable design. The roof 22 of the glass melting furnace 10 is positioned between about 3–10 feet above the surface of the raw glass-forming material. As well known in the art, the glass melting furnace 10 may optionally include one or more bubblers 24 and/or electrical boost electrodes. The bubblers and/or electrical boost electrodes increase the temperature of the bulk glass and increase the molten glass circulation under the batch cover.

The glass melting furnace 10 includes two successive zones, a melting zone 26 and a downstream fining zone 28. The melting zone 26 is considered the upstream zone of the glass melting furnace 10 wherein raw glass-forming material 30 is charged into the furnace using a charging device 32 of a type well known in the art. The raw glass-forming material 30 may be a mixture of raw materials typically used in the manufacture of glass. It will be appreciated that the raw glass-forming material 30 make-up is dependent on the type of glass being produced. Normally, the material comprises, inter alia, silica containing materials including finely ground scrap glass commonly referred to as cutlet. Other glass-forming materials including feldspar, limestone, dolomite, soda ash, potash, borax and alumina may also be used. To alter the properties of the glass, a minor amount of arsenic, antimony, sulfates, carbon and/or fluorides may also be added. Moreover, color forming metal oxides may be added to obtain the desired color.

The raw glass-forming material 30 forms a batch layer of solid particles on the surface of the molten glass in the melting zone 26 of the glass melting furnace 10. The floating solid batch particles of raw glass-forming material 30 are melted principally by at least one oxygen-fuel burner 34 having a controlled impinging flame shape and length mounted within the roof 22 of the glass melting furnace 10. It will be appreciated that it has been found that the installation of at least one oxygen-fuel burner 34 in the roof 22 of the glass melting furnace 10 over the raw glass-forming material 30 in accordance with the present invention increases the melting rate of the solid raw glass-forming material and, at the same time, maintains the operating temperature of the surrounding refractory material within acceptable operating limits.

As used herein, the phrase "at least one oxygen-fuel burner" means one or more oxygen fuel burners. Furthermore, as used herein the phrase "principally by at least one oxygen-fuel burner" refers to the condition wherein at least 70% of the energy for melting of the raw glass-forming material is from at least one oxygen-fuel burner.

Figure 2:
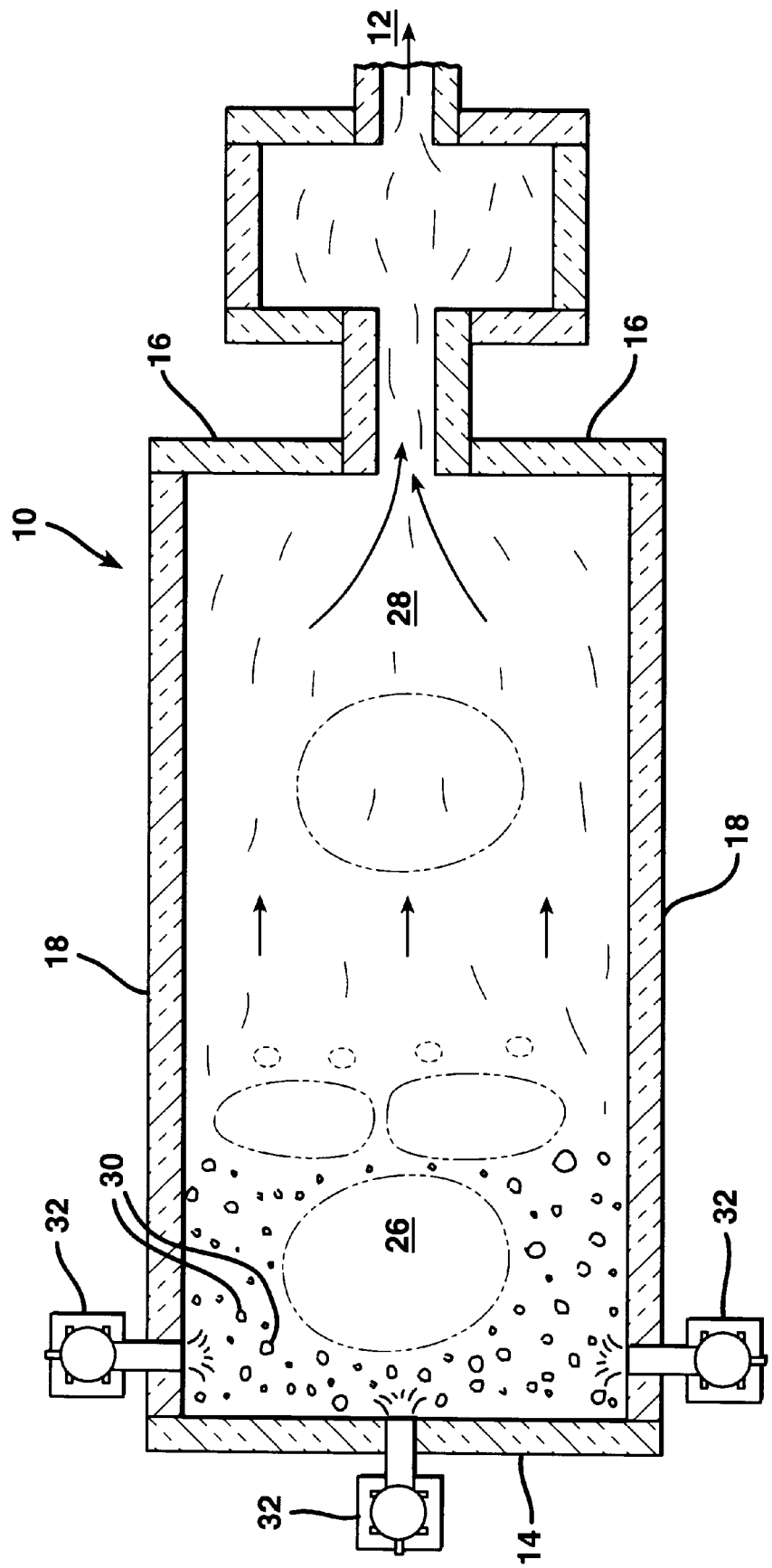
FIG. 2 is a cross-sectional plan view of the glass melting furnace of FIG. 1 taken along line 2—2.
Figure 3:
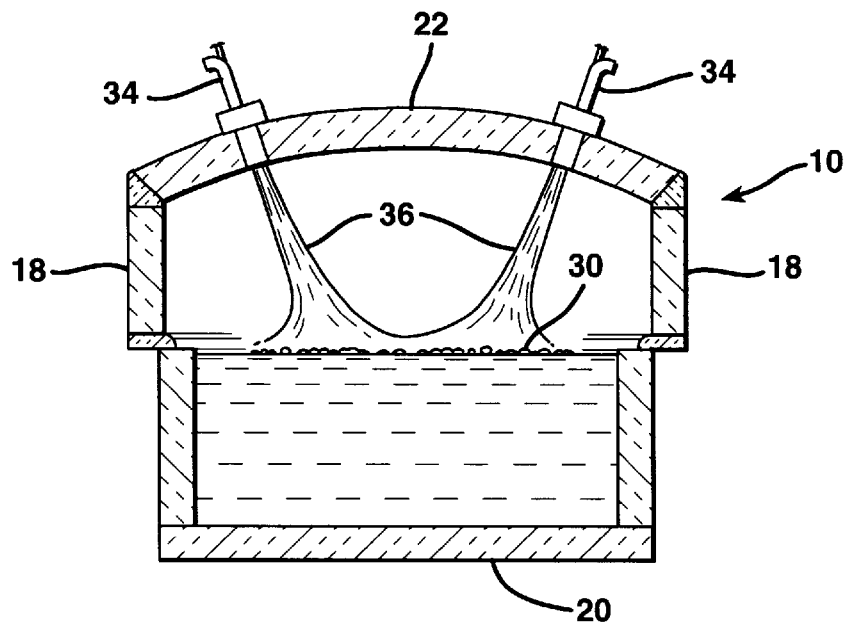
FIG. 3 is a cross-sectional view of the glass melting furnace of FIG. 1 taken along line 3—3 illustrating two oxygen-fuel burners adjacent the upstream end wall of the furnace.
Figure 4:
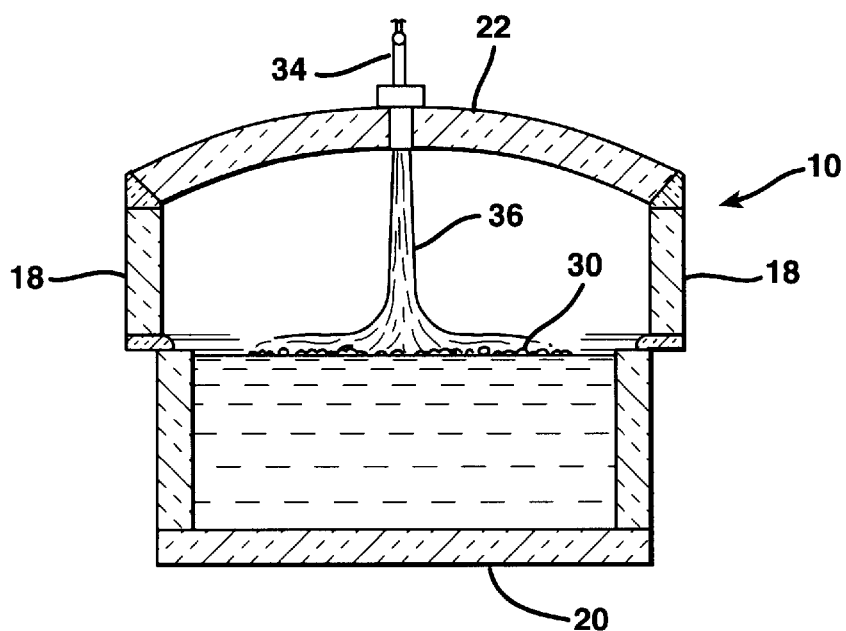
FIG. 4 is an alternate cross-sectional plan view of the glass melting furnace of FIG. 1 taken along line 3—3 illustrating one oxygen-fuel burner adjacent the upstream end wall of the furnace.

In one particular embodiment, as shown in FIGS. 1, 2 and 4, the glass melting furnace 10 includes three oxygen-fuel burners 34. A single oxygen-fuel burner 34 is positioned upstream of two adjacently positioned downstream oxygen-fuel burners. However, it will be appreciated that any number of oxygen-fuel burners 34 may be positioned at most any suitable location in the roof 22 of the furnace 10 over the batch to melt the raw glass-forming material 30. For example, two oxygen-fuel burners 34 may be positioned in a side-by-side relation (FIG. 3) or a single oxygen-fuel burner may be used (FIG. 4). Nonetheless, in accordance with the present invention, the angular orientation of each oxygen-fuel burner 34 in the roof 22 of the glass melting furnace must be such that the flame 36 produced is directed substantially perpendicular to the glass batch surface to produce a flame which impinges on the glass surface. In a preferred embodiment, the oxygen-fuel burners 34 are positioned at an angle of about 90+/−10 degrees relative to the raw glass-forming material 30. It has been found that the glass production rate and the quality of glass produced may be improved by melting the raw glass-forming material 30 with at least one downwardly firing oxygen-fuel burner 34 having a controlled impinging flame shape and length in accordance with the present invention.

Figure 5:
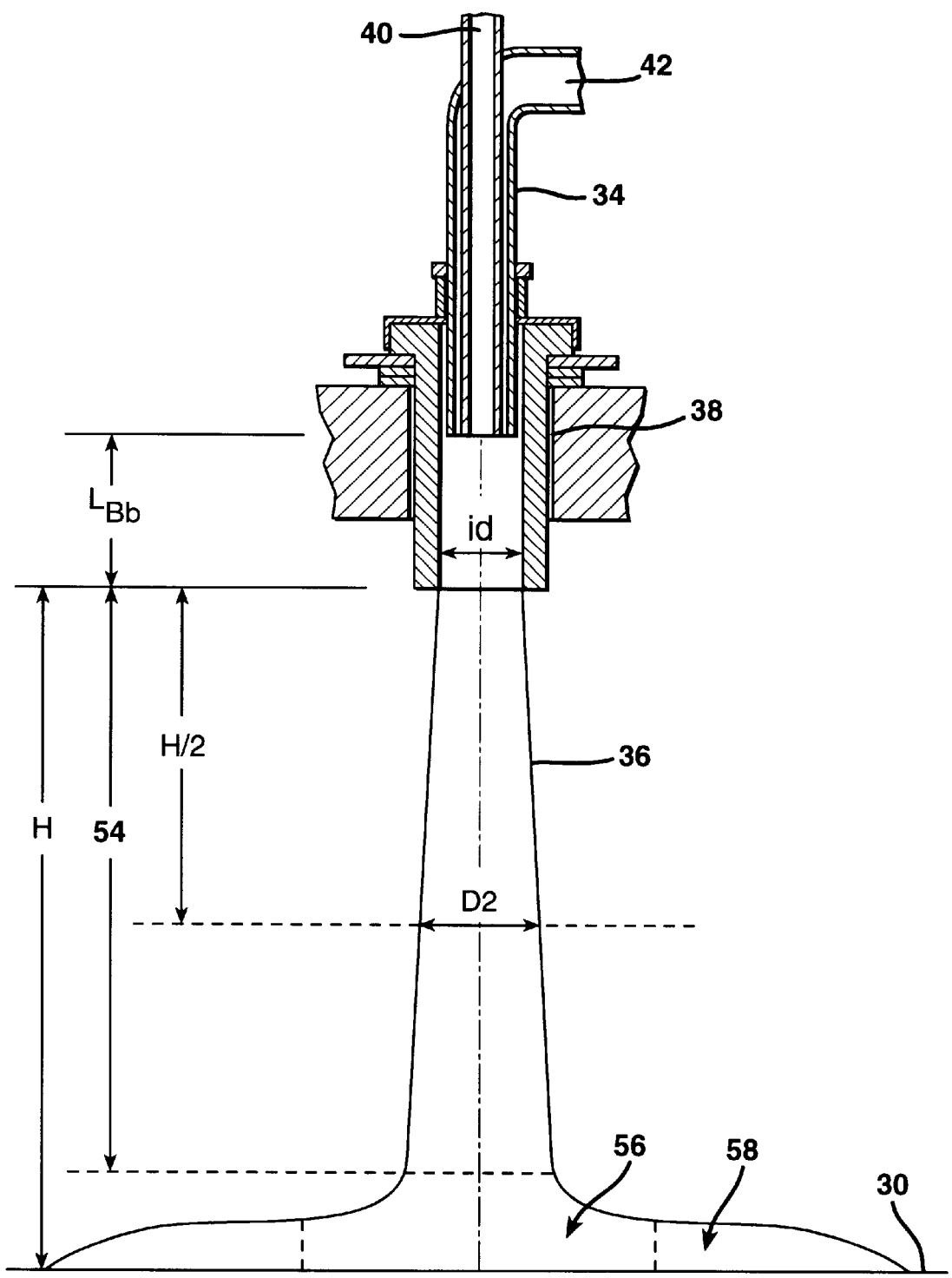
FIG. 5 is a cross-sectional view of an oxygen-fuel burner and a schematic representation of a burner flame from the oxygen-fuel burner.

Referring to FIG. 5, the at least one oxygen-fuel burner 34 within the roof 22 of the glass melting furnace 10 has an inner central cylindrical gaseous fuel conduit 40 for providing gaseous fuel and an outer cylindrical oxygen conduit 42 concentric with the central fuel outlet for providing oxygen flow. The oxygen-fuel burner 34 may have a capacity ranging from about 1–10 MM Btu/hr depending upon the glass melting furnace 10 size and desired pull rate. The oxygen-fuel burner 34 is designed to use a higher percentage of oxygen than is present in air and thus the temperature above the area of impingement of the flame 36 from the oxygen-fuel burner 34 is substantially higher than in a conventional glass melting furnace utilizing air-fuel burners. Notwithstanding, as well known to one skilled in the art the temperature of the flame 36 imparted by an oxygen-fuel burner 34 is dependent on the quality of the fuel and the oxygen/fuel ratio. In a preferred embodiment, the oxygen concentration of the oxygen-fuel burner 34 is typically at a level of about 95–125 percent of the stoichiometric amount of oxygen required to combust the fuel. However, the fuel to oxygen ratio can be varied to produce a range of operating conditions in the glass melting furnace 10 to effect one or more desired properties, including, for example, redox level, seed level and/or most any other glass property.

The oxygen-fuel burner 34 extends downwardly from a burner block 38 located in the roof 22 of the glass melting furnace 10. Each burner block 38 includes an opening having an inside diameter ($i_d$) which is at least as great as the external diameter of the cylindrical oxygen conduit 42. The inside diameter ($i_d$) of the opening of the burner block 38 may range between about 2–8 inches. The end of the oxygen-fuel burner 34 is recessed from the end of the burner block 38 a distance ($L_{Bb}$) between about 3–18 inches. It will be appreciated that the opening of the burner block 38 between the end of the oxygen-fuel burner 34 and the end of the burner block acts to focus the burner flame and prevent the burner flame from spreading outwardly. The burner block 38 is made of a refractory material as well known in the art and may be of most any suitable shape such as rectangular and the like.

The bottom surface of the burner block 38 may be flush with the inside surface of the roof 22 or the bottom surface may project below the inside surface of the roof from 2–18 inches to protect the roof and promote the formation of the impinging flame pattern having a controlled flame velocity at the point of impingement on the raw glass forming material. Furthermore, as shown in FIG. 5, the fuel conduit 40 and oxygen conduit 42 of the oxygen-fuel burner 34 extend downwardly within the burner block 38 and terminate at substantially the same vertical height from the surface of the raw glass-forming material 30.

In accordance with the present invention, the downwardly directed impinging flame 36 produced by the at least one oxygen-fuel burner 34 is precisely controlled to direct heat energy toward the raw glass-forming ingredients 30 and the surface of the molten glass and away from the surrounding refractory thereby reducing the risk of overheating the roof 22 and side walls 18 of the glass melting furnace 10. The impinging flame 36 may be controlled by such control devices as are conventional and standard in chemical processing. For example, valves, thermocouples, thermistors coupled with suitable servo circuits, heater controllers and the like are readily available and conventionally used for controlling the quantity and velocity of the fuel and oxygen from the oxygen-fuel burner 34. The resulting temperature profile produced within the glass melting furnace 10 is generally more uniform throughout the length of the glass melting furnace as opposed to a glass melting furnace employing air-fuel burners or a conventional oxygen-fuel furnace with oxygen-fuel burners placed in the side walls firing parallel to the surface of the glass. Typically, the temperature within the glass melting furnace 10 employing at least one oxygen-fuel burner 34 varies between about 2300–3100 degrees Fahrenheit. The impinging flame 36 is precisely controlled by controlling both the relative velocity and the maximum and minimum velocities of the fuel and of the oxygen from the at least one oxygen-fuel burner 34.

The relative velocity, i.e., the velocities of the gaseous fuel and the oxygen, must be substantially equivalent to provide a generally laminar gaseous fuel flow and generally laminar oxygen flow downward to the surface of the raw glass-forming material 30. In a preferred embodiment, the relative velocity of the gaseous fuel and the oxygen from the oxygen-fuel burner 34 may vary from one another by no more than about 20%. Furthermore, the maximum difference between the oxygen and fuel flow velocity at the exit of the oxygen-fuel burner 34 may not exceed about 50 standard feet per second. It will be appreciated that the laminar fuel flow and oxygen flow prevents premature mixing of the fuel and oxygen to allow for delayed mixing and combustion proximate a top surface of the raw glass-forming material 30 to produce a flame 36 which has a middle portion of an approximately columnar shape and which impinges the surface of the raw glass-forming material thereby providing optimum heat transfer to the raw glass-forming material. The "middle portion" refers to the free jet region 54 as further described herein.

In addition to providing substantially equivalent oxygen and fuel flow velocity, the maximum and minimum velocity of the fuel and oxygen flow impinging on the surface of the raw glass-forming material 30 must be controlled to prevent the entrainment of or the displacement of glass batch material against the side walls 18 and roof 22 while maintaining optimum convective heat transfer to the surface of the raw glass-forming material. It will be appreciated that the displacement of glass batch material against the side walls 18 and roof 22 will adversely effect the refractory material and possibly shorten the operating life of the glass melting furnace 10.

The maximum and minimum velocity of the fuel and of the oxygen of the oxygen-fuel burner 34 are also controlled to harness the maximum energy from the impinging flame 36 without damaging the surrounding refractory material. The maximum energy from the impinging flame 36 is achieved by minimizing the amount of heat released to the glass melting furnace 10 combustion space and maximizing the heat transfer to the raw-glass forming material 30. The operational maximum and minimum velocity range for the oxygen-fuel burner 34 to generate an acceptable heat transfer rate to the raw glass-forming material 30 without damaging the refractory material furnace walls and superstructure is a function of the concentric tube-in-tube design of the oxygen-fuel burner, burner block opening geometry and the velocities of the fuel and oxygen from the oxygen-fuel burner 34.

Figure 6:
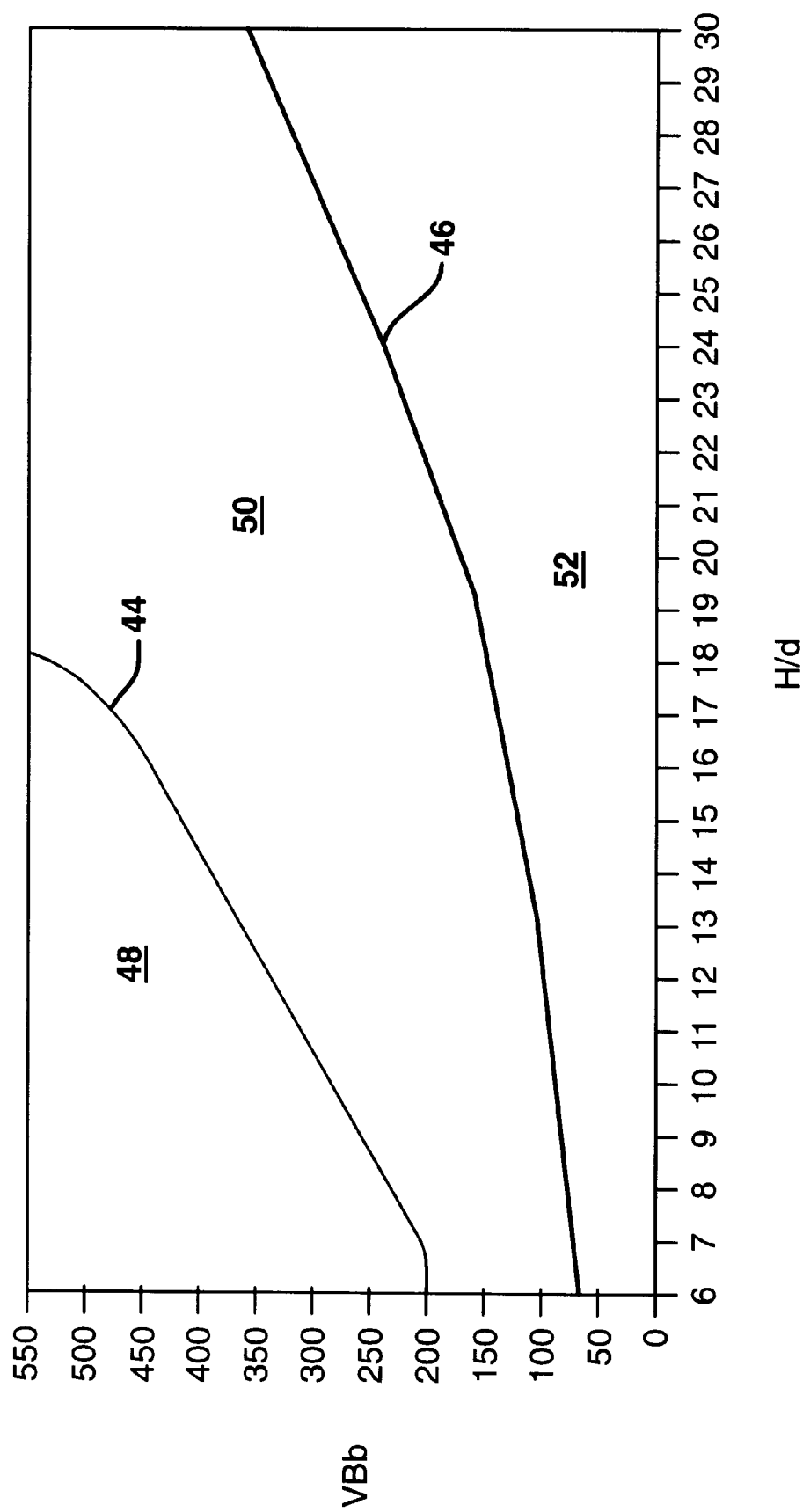
FIG. 6 is a chart illustrating an upper operating curve and a lower operating curve for an oxygen-fuel burner in accordance with the present invention.

Referring to FIG. 6, a chart is shown including an upper operating curve 44 and a lower operating curve 46. The x-axis of the chart is defined in terms of a dimensionless parameter ($H/i_d$) and the y-axis of the chart is defined in terms of the maximum flame velocity at the tip of the burner block ($V_{Bb}$). The upper operating curve 44 and the lower operating curve 46 represent the maximum and minimum allowed velocities at the tip of the burner block 38 ($V_{Bb}$) for a given ($H/i_d$) and define three operating zones; an upper operating zone 48, a middle operating zone 50, and a lower operating zone 52. The upper operating zone 48 represents excessive high velocity or an unsafe operating zone and the lower operating zone 52 represents a thermally inefficient zone. The middle operating zone 50 defines an acceptable area of operation of the oxygen-fuel burners 34 in accordance with the present invention. As shown in FIG. 6, the (H/$i_d$) parameter ranges between about 6–30 and the maximum permissible velocity at the tip of the burner block ($V_{Bb}$) is 550 feet per second. It will be appreciated that the middle operating zone 50 provides the required impinging flame 36 columnar shape and desired heat transfer properties to the raw glass-forming material 30.

The upper operating curve 44 and the lower operating curve 46 for the oxygen-fuel burner 34 are described by a fourth order linear polynomial:

$$V_{Bb} = a + b\left(\frac{H}{i_d}\right) + c\left(\frac{H}{i_d}\right)^2 + d\left(\frac{H}{i_d}\right)^3 + e\left(\frac{H}{i_d}\right)^4 \qquad \text{I}$$

Wherein, $V_{Bb}$=maximum velocity at the end of the burner block (feet/second), H=distance from the end of the burner block to the top of the raw glass-forming material surface (feet), $i_d$=inside diameter of the opening of the burner block (feet).

For the upper operating curve 44 as shown in FIG. 6, the ratio of H/$i_d$ is between about 6–20 and the range of $V_{Bb}$ is between about 190–550 feet per second, and the value of the coefficients is as follows: a=571.0801, b=−187.2957, c=30.1164, d=−1.8198 and e=0.04. For the lower operating curve 46 as shown in FIG. 6, the ratio of H/$i_d$ is between about 6–30 and the range of $V_{Bb}$ is between about 50–300 feet per second, and the value of the coefficients is as follows: a=−103.6111, b=38.9939, c=−2.8772, d=0.1033 and e=−0.00125. For a particular (H) and ($i_d$) as provided above, the (H/$i_d$) parameter is set (x-axis of the chart) which in turn determines the maximum velocity of the oxygen-fuel burner 36 at the tip of the burner block ($V_{Bb}$) (y-axis of the chart) which must be between the upper operating curve 44 and the lower operating curve 46 to provide the required impinging columnar flame 36 shape and desired heat transfer properties to melt the raw glass-forming material 30.

Referring to FIG. 5, in accordance with the present invention, the columnar shape of the impinging flame 36 when operating within the middle operating zone 50 of FIG. 6 is shown. The impinging flame 36 is an axisymmetric columnar flame having three distinct flow regions; a free jet region 54, a stagnation region 56 and a wall jet region 58.

The free jet region 54 is an unobstructed impinging flame region. Within the free jet region 54, the flame 36 develops a columnar shape before the flame impinges on the surface of the raw glass-forming material 30. The columnar flame shape is produced as a result of the controlled exit velocities of the oxygen and fuel streams. More particularly, within the free jet region 54, the oxygen and fuel streams flow from the opening of the burner block 38 to produce a controlled shear stress between the two streams that yields a controlled laminar stream for an extended length to provide a precisely controlled mixing of the two streams and a partial controlled combustion. The partial controlled combustion that is achieved in the free-jet region 54 is critical to the heat transfer characteristics of the developing impinging flame 36. The columnar free-jet flame shape has a flame diameter D2 at half the distance H/2 between the end of the burner block 38 and the surface of the raw glass-forming material 30 which is defined by the following relation.

$$1.5i_d \leq D2 \leq i_d + 0.15H \qquad \text{II}$$

Wherein, $i_d$=inside diameter of the opening of the burner block,

H=distance from the end of the burner block to the top surface of the raw glass-forming material, D2=flame diameter at one half the distance between the end of the burner block and the surface of the raw glass-forming material.

The second region, the stagnation region 56, is the region where the flame 36 penetrates the thermal boundary layer and impinges upon the surface of the raw glass-forming material 30. Within this region 56, the flame 36 penetrates the thermal boundary layer and impinges on the surface of the raw glass-forming material building a sharp pressure gradient at the surface that accelerates the horizontal flow of the deflected flame causing the flame to spread outwardly radially along the impinged surface. The end of the stagnation region 56 is defined as the location on the surface of the raw glass-forming material where the pressure gradient generated by the impinging flame 36 drops to zero. Within the stagnation region 56, by carefully controlling the flame 36 momentum, the thermal boundary layer that naturally exists at the surface of the raw glass-forming material 30 is penetrated and eliminated and thus its strong heat resistive features are attenuated. Accordingly, the heat generated by the impinging flame 36 penetrates more easily into the partially melted raw glass-forming material 30. Furthermore, within the stagnation region 56 the flame 36 luminosity significantly increases which enhances the radiation heat transfer into the relatively colder raw glass-forming material 30.

At the radial limits of the stagnation region 56 the wall jet region 58 begins. In this region, the flame 36 flows essentially parallel to the impinging surface and the thermal boundary layer grows along the impingement surface and outward from the stagnation region 56, thus the thermal boundary layer starts to build up restoring the surface resistance to the heat flow into the raw glass-forming material surface.

The controlled flame heat generation in the free-jet region 54 is the result of the tube-in-tube concentric design of the oxygen-fuel burner 34, inside diameter of the opening ($i_d$) of the burner block 38 and both the relative velocities and maximum and minimum velocities of the oxygen and fuel streams. By selectively controlling the design of the oxygen-fuel burner 34, the burner block 38 geometrical design and the velocities of the oxygen and fuel streams a reduced shear stress between the oxygen and gas streams is produced providing controlled partial combustion and reduced thermal radiation emissions. It will be appreciated that by operating the oxygen-fuel burner 34 within the middle operating zone 50 described herein, the flame heat generated in the free jet region 54 and the heat transfer resistance at the raw glass surface in the stagnation region 56 are minimized thereby maximizing the heat generated in the stagnation region.

The heat generated in the free-jet region 54 is the result of the following processes. First, the controlled partial combustion in the free-jet region 54 permits controlled combustion at the surface of the raw glass-forming material 30 thereby bringing the combustion process proximate to the surface of the raw glass-forming material. Bringing the combustion process proximate the surface of the raw glass-forming material 30 generates an elevated temperature gradient at the surface of the raw glass-forming material thereby improving the convection heat transfer. Second, the controlled partial combustion in the free-jet region 54 generates an acceptable temperature for the chemical dissociation of the combustion gases and the products of combustion. These dissociated species, once impinged on the relatively colder surface of the raw glass-forming material 30, partially recombine, exothermically, generating significant heat at the surface of the raw glass-forming material. The heat from the exothermic reactions further augments the convective heat transfer process.

The minimization of the heat resistance at the stagnation region 56 of the surface of the raw glass-forming material 30 is the result of the following factors. First, the thermal boundary layer is eliminated through the controlled flame 36 momentum and the turbulence generated by the carefully controlled combustion characteristics at the surface of the raw glass-forming material 30. Second, the localized surface heat generation allows for the conversion of the low thermal conductive raw glass-forming material 30 into a significantly better conductive molten glass material. This conversion allows for the heat generated at the surface to penetrate more efficiently into the raw glass-forming material depth. This improved heat penetration lowers the molten glass surface temperature, which increases the temperature gradient between the flame 36 and the molten-glass surface and augments the convective heat transfer process.

The molten glass flows from the melting zone 26 of the glass melting furnace 10 to the fining zone 28. In a preferred embodiment, the fining zone 28 includes at least one downstream oxygen-fuel burner 34 mounted in the roof 22 of the glass melting furnace 10. The downstream oxygen-fuel burner 34 is of an identical design as described above and must operate under the same conditions subject to controlled variation to achieve the desired net effect of the impinging flames. For example, the impinging flame 30 may be adjusted to be more luminous to affect the melting characteristics. The downstream oxygen-fuel burner 34 is positioned to fire downwardly over the location at which the normal convection currents tend to rise, e.g. ⅔–¾ the length of the glass melting furnace 10.

It will be appreciated that the at least one downstream oxygen-fuel burner 34 has been found to improve the quality of the glass moving forward into the forming area by removing surface defects such as incompletely reacted raw glass-forming material or insufficiently mixed surface materials by substantially raising the surface glass temperature, promoting melting and mixing. Furthermore, the at least one downstream oxygen-fuel burner 34 provides a barrier to the forward flow of material, promotes natural convection currents within the molten glass causing hotter glass to flow backwards under the raw glass-forming material thereby preventing a forward surge of the molten glass, increasing the melting effect and increasing the glass temperatures in the fining zone. The glass moving forward is also hotter and this leads to more rapid fining and reduced fuel consumption in the forward zones. In addition, for glass melting furnaces that normally have a layer of foam on the downstream glass surface, the downstream oxygen-fuel burner 34 has been found to reduce the foam. It will be appreciated that by reducing the foam the heat transfer is increased into the body of glass material so as to reduce the thermal energy otherwise required in the glass melting furnace 10 and improving the operating efficiency of the glass melting furnace.

The at least one roof mounted oxygen-fuel burner 34 may be either placed in a new glass melter furnace 10 or retrofitted into an existing glass melter furnace to substantially reduce plant space and increase the glass quality relative to an air-fuel fired furnace or a "conventional" side fired oxygen-fuel furnace. It will be appreciated that the present invention facilitates a substantial pull rate increase, reduction in glass melting furnace 10 wall temperature and improved glass quality as compared to the same air-fuel furnace or conventional oxygen-fuel furnace that is not retrofitted with at least one roof mounted oxygen-fuel burner as described herein. Furthermore, as will be readily appreciated by one skilled in the art, the use of at least one oxygen-fuel burner as opposed to an all air-fuel burner system appreciably reduces NOx emissions.

The patents and documents described herein are hereby incorporated by reference.

Although the invention has been described in detail with reference to certain specific embodiments, those skilled in the art will recognize that there are other embodiments within the spirit and scope of the claims.

What is claimed is:

1. A process for producing refined glass from raw glass-forming material in a refractory lined glass melter, the glass melter having a roof connected to a bottom by side walls, defining an elongated channel having a melting zone and a downstream fining zone, the process comprising the steps of:

charging raw glass-forming material to the melting zone of the glass melter;

providing at least one oxygen-fuel burner recessed within a burner block within the roof of the glass melter, the oxygen-fuel burner having an inner central cylindrical gaseous fuel conduit for providing gaseous fuel and an outer cylindrical oxygen conduit concentric with the inner fuel conduit for providing oxygen, the at least one oxygen-fuel burner having a longitudinal axis substantially perpendicular to a surface of the raw glass-forming material; and controlling the maximum velocity of the gaseous fuel and the oxygen from the oxygen-fuel burner at the exit of said burner block within an operating zone, the operating zone defined by an upper operating curve according to the following fourth order linear polynomial:

$$V_{Bb} = a + b\left(\frac{H}{i_d}\right) + c\left(\frac{H}{i_d}\right)^2 + d\left(\frac{H}{i_d}\right)^3 + e\left(\frac{H}{i_d}\right)^4 \quad [\text{I}]$$

wherein,
$H/i_d$=about 6–20,
$V_{Bb}$=about 190–550 feet per second,
a=571.0801,
b=−187.2957,
c=30.1164,
d=−1.8198,
e=0.04,
and a lower operating curve according to the following fourth order linear polynomial:

$$V_{Bb} = a + b\left(\frac{H}{i_d}\right) + c\left(\frac{H}{i_d}\right)^2 + d\left(\frac{H}{i_d}\right)^3 + e\left(\frac{H}{i_d}\right)^4 \quad [\text{I}]$$

wherein,
$H/i_d$=about 6–30,
$V_{Bb}$=about 50–300 feet per second,
a=−103.6111,
b=38.9939, c=−2.8772,
d=0.1033,
e=−0.00125 to combust proximate a top surface of the raw glass-forming material and produce a flame having a middle portion of an approximately columnar shape;

melting raw glass-forming material within the melting zone by means of the flame coverage from the at least one oxygen-fuel burner, refining the melted raw glass-forming material in the fining zone; and withdrawing the refined glass from the fining zone.

2. The process of claim 1 further comprising the step of providing at least one oxygen-fuel burner recessed within a burner block within the roof of the glass melter over the downstream fining zone.

3. A process for producing refined glass from raw glass-forming material in a refractory lined glass melter, the glass melter having a roof connected to a bottom by side walls, defining an elongated channel having a melting zone and a downstream fining zone, the process comprising the steps of:

charging raw glass-forming material to the melting zone of the glass melter to form a surface of raw glass-forming material;

providing at least one oxygen-fuel burner recessed within a burner block in the roof of the glass melter, the at least one oxygen-fuel burner having a longitudinal axis substantially perpendicular to a surface of the raw glass-forming material and; and controlling the velocity of the gaseous fuel and the oxygen from the at least one oxygen-fuel burner such that a flame forms a free jet region extending between the burner block and a stagnation region, wherein the flame in the free jet region has an approximately columnar shape with a flame diameter defined by the following relation:

$$1.5 i_d \leq D2 \leq i_d + 0.15H$$

where, $i_d$=inside diameter of the opening of the burner block,

H=distance from the end of the burner block to a top surface of the raw glass-forming material, D2=flame diameter at one half the distance between the end of the burner block and the surface of the raw glass-forming material;

melting raw glass-forming material within the melting zone by means of the flame coverage from the at least one oxygen-fuel burner, and withdrawing the refined glass from the fining zone.

4. The process of claim 3, wherein the stagnation region extends radially outward from the free-jet region, an impingement point of the flame penetrating a thermal boundary layer of the raw glass-forming material and impinges upon the surface of the raw glass-forming material to create a pressure gradient at the surface of the raw glass-forming material, thereby causing the flame to spread radially outward along the surface of the raw glass-forming material.

5. The process of claim 4, wherein the flame produced by the at least one oxygen-fuel burner further includes a wall jet region extending radially outward from the stagnation region where the flame flows essentially parallel to the surface of the raw glass-forming material allowing for a build-up of the thermal boundary layer of the raw glass-forming material, thereby restoring a surface resistance to a flow of heat into the surface of the raw glass-forming material.

\* \* \* \* \*